(12) United States Patent
Yang et al.

(10) Patent No.: US 10,644,520 B2
(45) Date of Patent: May 5, 2020

(54) BATTERY PROTECTION BOARD, BATTERY AND MOBILE TERMINAL

(71) Applicant: GUANGDONG OPPO MOBILE TELECOMMUNICATIONS CORP., LTD., Dongguan (CN)

(72) Inventors: Bo Yang, Dongguan (CN); Jun Zhang, Dongguan (CN); Chen Tian, Dongguan (CN); Jialiang Zhang, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 110 days.

(21) Appl. No.: 15/606,463

(22) Filed: May 26, 2017

(65) Prior Publication Data
US 2017/0346315 A1 Nov. 30, 2017

Related U.S. Application Data

(63) Continuation-in-part of application No. PCT/CN2016/083691, filed on May 27, 2016, and a
(Continued)

(51) Int. Cl.
*H02J 7/00* (2006.01)
*H02H 7/18* (2006.01)
(Continued)

(52) U.S. Cl.
CPC ......... *H02J 7/0029* (2013.01); *H01M 10/425* (2013.01); *H01M 10/46* (2013.01);
(Continued)

(58) Field of Classification Search
CPC .......... H02J 7/0029; H02J 7/0091; H02J 7/18; H02J 7/0052; H02J 2007/004;
(Continued)

(56) References Cited

U.S. PATENT DOCUMENTS 5,250,893 A * 10/1993 Gambill ................. G01R 15/09
324/115
6,208,117 B1 * 3/2001 Hibi ..................... H02J 7/0021
320/134
(Continued)

FOREIGN PATENT DOCUMENTS

| CN | 1134620 A | 10/1996 |
|---|---|---|
| CN | 2678222 Y | 2/2005 |

(Continued)

OTHER PUBLICATIONS

PCT/CN2016/083691 International Search Report and Written Opinion, dated Mar. 7, 2017, 11 pages.
(Continued)

*Primary Examiner* — Naum Levin
(74) *Attorney, Agent, or Firm* — Lathrop GPM LLP (57) ABSTRACT

Embodiments of the present disclosure provide a battery protection board, a battery and a mobile terminal. A battery protection board includes a protection circuit and a detection circuit. The protection circuit is configured to be coupled to a charge and discharge circuit of a battery in a mobile terminal. The detection circuit is coupled to at least part of the protection circuit and configured to detect a voltage drop generated by an impedance of the at least part of the protection circuit and to determine a charging current or a discharging current of the charge and discharge circuit according to the voltage drop and the impedance of the at least part of the protection circuit during a charge and discharge process of the battery.

19 Claims, 8 Drawing Sheets

Related U.S. Application Data continuation-in-part of application No. PCT/CN2016/083692, filed on May 27, 2016, and a continuation-in-part of application No. PCT/CN2016/083693, filed on May 27, 2016, and a continuation-in-part of application No. PCT/CN2016/083694, filed on May 27, 2016, and a continuation-in-part of application No. PCT/CN2016/083695, filed on May 27, 2016, and a continuation-in-part of application No. PCT/CN2016/083696, filed on May 27, 2016.

(51) Int. Cl.
*H01M 10/46* (2006.01)
*H01M 10/42* (2006.01)
*H01M 10/48* (2006.01)

(52) U.S. Cl.
CPC .......... *H01M 10/48* (2013.01); *H01M 10/486* (2013.01); *H02H 7/18* (2013.01); *H02J 7/00* (2013.01); *H02J 7/0091* (2013.01); *H02J 7/00302* (2020.01); *H02J 7/00306* (2020.01)

(58) Field of Classification Search
CPC .......... H02J 2007/0037; H01M 10/48; H01M 10/486; H01M 10/425; H01M 10/46
See application file for complete search history.

(56) References Cited

U.S. PATENT DOCUMENTS

| | | | | |
|---|---|---|---|---|
| 6,771,049 B2* | 8/2004 | Kawagoe | ............. | H02J 7/0031 320/136 |
| 6,804,100 B2* | 10/2004 | Astala | ................. | H02J 7/0029 320/134 |
| 7,215,096 B2* | 5/2007 | Miura | ................. | H02J 7/0031 320/134 |
| 7,459,884 B2 | 12/2008 | Sasaki et al. | | |
| 7,586,292 B1* | 9/2009 | Wakefield | ............... | H02H 7/18 320/136 |
| 7,719,234 B2* | 5/2010 | Carrier | .................... | B25F 5/00 320/112 |
| 7,737,660 B2* | 6/2010 | Yun | ...................... | H02J 7/0004 320/132 |
| 7,847,519 B2* | 12/2010 | Ho | ........................ | H02J 7/0031 320/134 |
| 7,859,226 B2* | 12/2010 | Nakazawa | ............. | H01M 2/34 320/134 |
| 8,421,416 B2* | 4/2013 | Hsu | ...................... | H02J 7/0072 320/132 |
| 8,610,405 B2* | 12/2013 | Yamazaki | ............. | H02J 7/0052 320/134 |
| 8,829,717 B2* | 9/2014 | Kudo | .................... | H02J 7/0018 307/77 |
| 8,953,293 B2* | 2/2015 | Ji | ........................ | H01M 10/42 361/91.1 |
| 8,981,725 B2* | 3/2015 | Kim | ........................ | H02H 7/18 320/134 |
| 8,994,370 B2* | 3/2015 | Pannetier-Lecoeur | ...................... | G01R 15/205 324/252 |
| 9,110,100 B2* | 8/2015 | Lee | .......................... | G01R 1/20 |
| 9,279,731 B2 | 3/2016 | Egley et al. | | |
| 9,431,833 B2* | 8/2016 | Hashimoto | ........... | H01M 10/48 |
| 9,577,443 B2* | 2/2017 | Gach | .................... | H02J 7/0021 |
| 9,614,257 B2* | 4/2017 | Teramoto | ............. | H01M 10/48 |
| 10,103,412 B2* | 10/2018 | Li | ......................... | H01M 2/105 |
| 10,164,449 B2* | 12/2018 | Liang | .................... | H02H 3/085 |
| 10,389,144 B2* | 8/2019 | Jin | ......................... | H02J 7/0026 |
| 10,389,148 B2* | 8/2019 | Kim | .................... | H01M 10/443 |
| 2005/0073282 A1* | 4/2005 | Carrier | ..................... | B25F 5/00 320/106 |
| 2008/0048621 A1* | 2/2008 | Yun | ...................... | H02J 7/0004 320/136 |
| 2012/0062034 A1 | 3/2012 | Shu et al. | | |
| 2012/0262122 A1* | 10/2012 | Sato | ......................... | H02J 7/00 320/128 |
| 2012/0262123 A1* | 10/2012 | Lee | ........................ | G01R 1/20 320/134 |
| 2013/0143074 A1* | 6/2013 | Kim | .................... | B29C 45/1676 429/7 |
| 2013/0295421 A1 | 11/2013 | Teramoto et al. | | |
| 2014/0239964 A1* | 8/2014 | Gach | .................... | H02J 7/0021 324/433 |
| 2014/0269821 A1* | 9/2014 | Egley | ..................... | G01K 1/026 374/54 |
| 2016/0064979 A1* | 3/2016 | Huang | .................. | H02J 7/0055 320/114 |
| 2016/0093921 A1* | 3/2016 | Kadirvel | ............... | H01M 10/48 320/112 |
| 2016/0254688 A1* | 9/2016 | Jung | ........................ | H02J 7/007 320/164 |
| 2017/0250549 A1* | 8/2017 | Jin | ........................ | H02J 7/0081 |
| 2017/0346314 A1* | 11/2017 | Tian | ...................... | H02J 7/0029 |
| 2018/0069273 A1* | 3/2018 | Zhang | .................... | H01M 2/02 |

FOREIGN PATENT DOCUMENTS

| | | |
|---|---|---|
| CN | 1691451 A | 11/2005 |
| CN | 2935489 Y | 8/2007 |
| CN | 101106283 A | 1/2008 |
| CN | 201733077 U | 2/2011 |
| CN | 102082310 A | 6/2011 |
| CN | 201858546 U | 6/2011 |
| CN | 102377207 A | 3/2012 |
| CN | 102411127 A | 4/2012 |
| CN | 102593795 A | 7/2012 |
| CN | 102593905 A | 7/2012 |
| CN | 202503269 U | 10/2012 |
| CN | 103226183 A | 7/2013 |
| CN | 103257699 A | 8/2013 |
| CN | 103269097 A | 8/2013 |
| CN | 203398103 U | 1/2014 |
| CN | 203398750 U | 1/2014 |
| CN | 203490636 U | 3/2014 |
| CN | 203491732 U | 3/2014 |
| CN | 104218542 A | 12/2014 |
| CN | 204179074 U | 2/2015 |
| CN | 104393627 A | 3/2015 |
| CN | 204422727 U | 6/2015 |
| CN | 204666703 U | 9/2015 |
| CN | 105021998 A | 11/2015 |
| CN | 205070405 U | 3/2016 |
| CN | 106463991 A | 2/2017 |
| JP | H08203568 A | 8/1996 |
| JP | 2002188966 A | 7/2002 |
| JP | 2005033965 A | 2/2005 |
| JP | 2009131023 A | 6/2009 |
| JP | 2012065392 A | 3/2012 |
| JP | 5888459 B1 | 3/2016 |
| WO | WO 2016039344 A1 | 3/2016 |

OTHER PUBLICATIONS

PCT/CN2016/083692 International Search Report and Written Opinion, dated Mar. 7, 2017, 12 pages.
PCT/CN2016/083693 International Search Report and Written Opinion, dated Mar. 2, 2017, 12 pages.
PCT/CN2016/083696 International Search Report and Written Opinion, dated Feb. 17, 2017, 12 pages.
PCT/CN2016/083694 International Search Report and Written Opinion, dated Feb. 16, 2017, 12 pages.
PCT/CN2016/083695 International Search Report and Written Opinion, dated Feb. 22, 2017, 12 pages.
PCT/CN2017/085793 English translation of international search report and written opinion dated Aug. 15, 2013, 14 pages.
Zhou, Z et al. "*Portable Electronic Device Charger Practical Circuit and Power Management*", China Electric Power Press, full text, cited in office action dated Oct. 31, 2018 for Chinese Patent application No. 201680001592.6, 5 pages.

(56) References Cited

OTHER PUBLICATIONS

"*Single Battery Battery Protection S-8261 Series*", qzb6, full text, cited in office action dated Oct. 31, 2018 for Chinese Patent application 201680001592.6, 40 pages.
Chinese Patent Application No. 201680001592.6, English translation of Office Action dated Oct. 31, 2018, 7 pages.
Chinese Patent Application No. 201680001592.6, Office Action dated Oct. 31, 2018, 8 pages.
PCT/CN2016/083693 International Search Report and Written Opinion dated Mar. 2, 2017, 12 pp.
PCT/CN2016/083692 International Search Report and Written Opinion dated Mar. 7, 2017, 12 pp.
PCT/CN2016/083693 English Translation of the International Search Report dated Mar. 2, 2017, 3 pp.
PCT/CN2016/083692 English Translation of the International Search Report dated Mar. 7, 2017, 2 pp.
Japanese Patent Application No. 2018-554754, Office Action dated Nov. 8, 2019, 7 pages.
Japanese Patent Application No. 2018-554754, English translation of Office Action dated Nov. 8, 2019, 7 pages.
Indian Patent Application No. 201734018487 Office Action dated Feb. 17, 2020, 6 pages.

\* cited by examiner

BATTERY PROTECTION BOARD, BATTERY AND MOBILE TERMINAL

CROSS-REFERENCE TO RELATED APPLICATIONS

This application is a continuation-in-part of International Patent Application Serial Nos. PCT/CN2016/083691, PCT/CN2016/083692, PCT/CN2016/083693, PCT/CN2016/083694, PCT/CN2016/083695 and PCT/CN2016/083696, all filed on May 27, 2016, the entire contents of which are incorporated herein by reference.

FIELD

Embodiments of the present disclosure relate to a field of mobile terminals, and more particularly, to a battery protection board, a battery and a mobile terminal.

BACKGROUND

With the fast development of mobile communications, computing and processing capability of a mobile terminal is multiplied. Meanwhile, power consumption of the mobile terminal is increased accordingly. Further, a battery capacity of the mobile terminal is also increased so as to ensure a battery lifespan. As a result, a variety of fast charging technologies emerge to fill the large capacity battery quickly.

Meanwhile, phenomena such as overcharge, overdischarge, and short circuit will seriously damage the battery lifespan, and even threaten safety of users. The battery is generally provided with a battery protection board so as to avoid these phenomena and provide security protection for a charge and discharge process of the battery.

SUMMARY

Embodiments of the present disclosure provide a battery protection board, a battery and a mobile terminal.

A battery protection board according to an embodiment of the present disclosure includes a protection circuit and a detection circuit. The protection circuit is configured to be coupled to a charge and discharge circuit of a battery in a mobile terminal. The detection circuit is coupled to at least part of the protection circuit and configured to detect a first voltage drop generated by an impedance of the at least part of the protection circuit and determine a charging current or a discharging current of the charge and discharge circuit according to the first voltage drop and the impedance of the at least part of the protection circuit during a charge and discharge process of the battery.

A battery according to an embodiment of the present disclosure includes a charge and discharge circuit, a cell and the battery protection board described above. The cell is coupled to the charge and discharge circuit. The battery protection board is coupled to the cell.

A mobile terminal according to an embodiment of the present disclosure includes a charging interface and the battery described above. The battery is coupled to the charging interface.

BRIEF DESCRIPTION OF THE DRAWINGS

In order to make the technical solutions of embodiments of the present disclosure more clearly, the accompanying drawings used in the description of embodiments of the present disclosure are briefly described hereunder. Obviously, the described drawings are merely some embodiments of present disclosure. For those skilled in the art, other drawings can be obtained based on these drawings without any creative work.

DETAILED DESCRIPTION

The battery protection board generally includes a detection circuit and a protection circuit. The detection circuit is configured to detect whether a charge and discharge process of a battery is abnormal, for example, detect whether overcharge, overdischarge, or short circuit occurs. The protection circuit is configured to control a charge and discharge circuit of the battery to turn off when the charge and discharge process is abnormal.

The detection circuit is generally configured to detect whether the charge and discharge process of the battery is abnormal by detecting a voltage drop (or a voltage difference). In detail, in the related art, a special impedance component for detecting the voltage drop is generally coupled to the charge and discharge circuit in series. The detection circuit is configured to detect the voltage drop across two terminals of the impedance component and to determine whether the charge and discharge process of the battery is abnormal according to the voltage drop detected. For example, the charging current or the discharging current is determined according to the voltage drop, and the charging current or the discharging current is compared with a threshold so as to determine whether the charge and discharge process of the battery is abnormal. A quantity of heat generated by the battery protection board itself is great. If the impedance component is introduced into the battery protection board, a total impedance of the battery protection board is further increased, thereby causing a more serious heating of the battery protection board according to a formula of $P=I^2R$ (P represents a thermal power, I represents a current, and R represents an impedance).

In order to reduce the quantity of heat generated by the battery protection board, the special impedance component may be replaced by an impedance component existing in the battery protection board. Thus, there is no need to introduce the special impedance component, thereby reducing the total impedance of the battery protection board, and reducing the heat generated by the battery protection board.

In at least one embodiment, the detection circuit is configured to detect a first voltage drop generated by an impedance of at least part of the protection circuit during the charging and discharging process. That is, the special impedance component may be replaced by the impedance of at least part of the protection circuit, thereby reducing the quantity of heat generated by the battery protection board.

According to embodiments of the present disclosure, the number of the detection circuits and the number of the protection circuits in the battery protection board are not particularly limited. In at least one embodiment, the battery protection board may include one detection circuit and one protection circuit. In at least one embodiment, the battery protection board may include two detection circuits and two protection circuits having a one-to-one correspondence with the two detection circuits, for example, one first detection circuit and one first protection circuit corresponding thereto, and one second detection circuit and one second protection circuit corresponding thereto. In at least one embodiment, the battery protection board may include more detection circuits and more protection circuits, for example, one first detection circuit and one first protection circuit corresponding thereto, and two or more second detection circuits and two or more second protection circuits corresponding thereto. In the following, by taking battery protection board having a double protection mechanism as an example, various circuits in the battery protection board will be described in detail.

In at least one embodiment, the battery protection board having the double protection mechanism may include a first protection circuit for performing a first protection, a first detection circuit corresponding to the first protection circuit, a second protection circuit for performing a second protection and a second detection circuit corresponding to the second protection circuit.

In at least one embodiment, the first protection circuit is configured to control the charge and discharge circuit to turn on or off in accordance with a detection result of the first detection circuit. This protection may be a basic protection of the battery protection board.

In at least one embodiment, the second protection circuit is configured to control the charge and discharge circuit to turn on or off in accordance with a detection result of the second detection circuit. This protection may be of security class. The protection provided by the second protection circuit may be regarded as the last protection provided by the battery protection board. In general, the second protection may be triggered after the first protection fails. From a security perspective, the second protection is very important. This is because once the second protection is abnormal, it is likely to cause serious accidents such as battery burning and explosion.

In at least one embodiment, the first detection circuit is configured to perform one or more of: detection of the charging current of the battery, detection of the discharging current of the battery, detection of a battery voltage, detection of a temperature of the battery protection board, impedance compensation under different temperatures, etc. In at least one embodiment, the first detection circuit may achieve a control on the first protection circuit. In at least one embodiment, the first detection circuit may also have a certain data processing capability.

In at least one embodiment, the first detection circuit may store written data or calculation results. For example, a memory may be integrated in the first detection circuit, and the written data or the calculation results, such as a correspondence between impedance and temperature in the protection circuit, may be stored in the memory.

Figure 1:
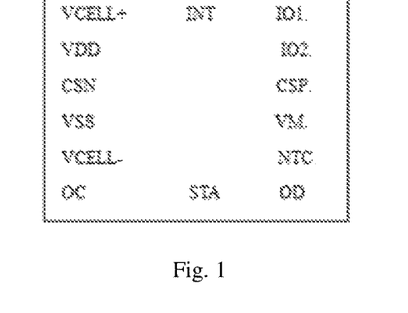
FIG. 1 is a schematic diagram illustrating a control chip in a detection circuit according to an embodiment of the present disclosure.

In detail, the first detection circuit may include an integrated circuit (IC for short) chip. FIG. 1 illustrates an example of an IC chip. As illustrated in FIG. 1, the IC chip includes a plurality of pins. A function of each pin is illustrated in the following table. It should be understood that the IC chip in FIG. 1 is only an example, and the pins of the IC chip may be increased or decreased according to actual situations.

TABLE ONE pins and their functions in the IC chip

| pin | function |
| --- | --- |
| VCELL+ | input of cell positive electrode, for detecting cell voltage |
| VCELL− | input of cell negative electrode, for detecting cell voltage |
| VDD | positive voltage input of supply power |
| VSS | ground of supply power |
| CSP | positive input for detecting current |
| CSN | negative input for detecting current |
| NTC | terminal for coupling to thermistor, and for detecting temperature |
| VM | input of voltage detection of current loop, for detecting charging, or discharge status |
| OD | discharging control driving output |
| OC | charging control driving output |
| INT | interrupt signal output |
| STA | status signal output |
| IO1 | communication interface 1 |
| IO2 | communication interface 2 |

In at least one embodiment, the first protection circuit may include a switch-type component. In at least one embodiment, the first protection circuit may achieve bidirectional turn-off (i.e., turn-off of charging and turn-off of discharging). In at least one embodiment, the first protection circuit may have characteristics of low on-impedance and high off-impedance. In at least one embodiment, the first protection circuit may have characteristics of repeated turn-on and turn-off. The first protection circuit may be controlled by the first detection circuit.

Figure 2:
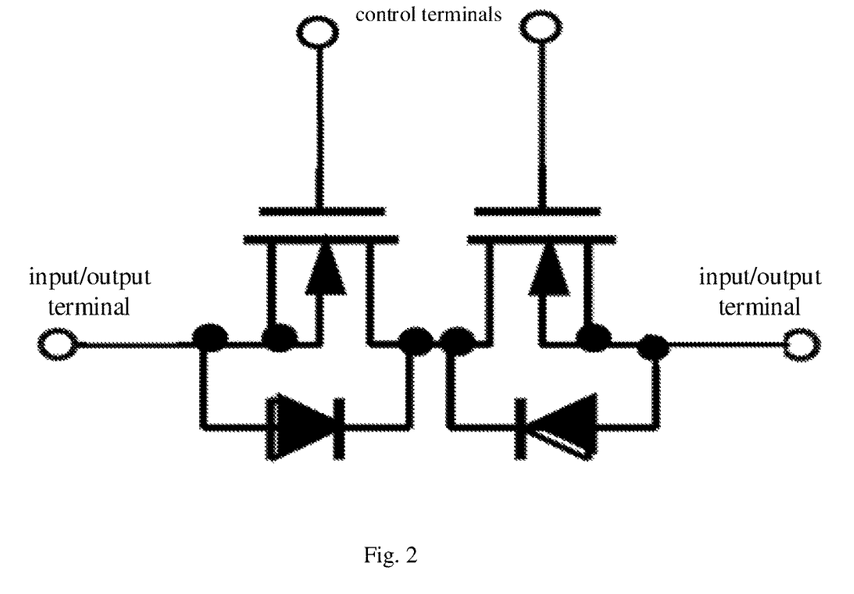
FIG. 2 is a schematic diagram illustrating a protection circuit according to an embodiment of the present disclosure.

In detail, the first protection circuit may adopt a structure as illustrated in FIG. 2. That is, turn-on and turn-off of the charge and discharge circuit may be realized by a pair of back-to-back metal oxide semiconductor (MOS for short) transistors. Control terminals of the MOS transistors may be coupled to the first detection circuit, for example, coupled to OC and OD pins in Table 1. Input/output terminals of the MOS transistors may be coupled to the charge and discharge circuit of the battery in series. It is to be understood that FIG. 2 only illustrates an example structure of the protection circuit, and embodiments of the present disclosure may be not limited thereto and may use any other switch structures.

In at least one embodiment, the second detection circuit is configured to perform one or more of: detection of the charging current of the battery, detection of the discharging current of the battery, detection of a cell voltage, detection of a temperature of the battery protection board, impedance compensation under different temperatures, etc. In at least one embodiment, the second detection circuit may achieve a control on the second protection circuit. In at least one embodiment, the second detection circuit may also have a certain data processing capability. In at least one embodiment, the second detection circuit may store written data or calculation results, for example, a correspondence of impedance and temperature in the protection circuit.

In at least one embodiment, the second detection circuit may implement same or similar functions as the first detection circuit, but some parameters or technical indicators may be different. For example, the second detection circuit may be configured to detect a cell voltage so as to ensure that the cell is not overcharged or overdischarged, and the first detection circuit may be configured to detect a battery voltage. For another example, protection thresholds of current, voltage, temperature in the second detection circuit may be slightly larger than those in the first detection circuit, so that the second detection circuit may continue to take over the task of protecting the battery after the first detection circuit has failed. In at least one embodiment, the second detection circuit may implement partially same or different functions as the first detection circuit, both of which may be redundant or complementary to each other to realize protecting the battery, and embodiments of the present disclosure are not particularly limited thereto.

The second detection circuit may include the IC chip as illustrated in FIG. 1. Protecting the charge and discharge process of the battery may be realized via the IC chip and reference may be made to the above description.

In at least one embodiment, the second protection circuit may include a switch-type component. In at least one embodiment, the second protection circuit may achieve bidirectional turn-off (i.e., turn-off of charging and turn-off of discharging). In at least one embodiment, the second protection circuit may have characteristics of low on-impedance and high off-impedance. In at least one embodiment, the second protection circuit may have characteristics of repeated turn-on and turn-off. The second protection circuit may be controlled by the second detection circuit.

In detail, the second protection circuit may adopt a structure as illustrated in FIG. 2. That is, turn-on and turn-off of the charge and discharge circuit may be realized by a pair of back-to-back metal oxide semiconductor (MOS for short) transistors. Control terminals of the MOS transistors may be coupled to the first detection circuit, for example, coupled to OC and OD pins in Table 1. Input/output terminals of the MOS transistors may be coupled to the charge and discharge circuit of the battery in series. It is to be understood that FIG. 2 only illustrates an example structure of the protection circuit, and embodiments of the present disclosure may be not limited thereto and may use any other switch structures.

Functions of the circuits in the battery protection board having the double protection mechanism are mainly described above. Positions and connections of the circuits in the battery protection board will be described in detail below with reference to FIGS. 3 to 6. It should be noted that V1 and V2 in FIGS. 3 to 6 denote output voltages at two terminals of the cell, but a relationship between V1 and V2 in embodiments of the present disclosure is not particularly limited, which may be V1−V2>0 or V1−V2<0.

Figure 3:
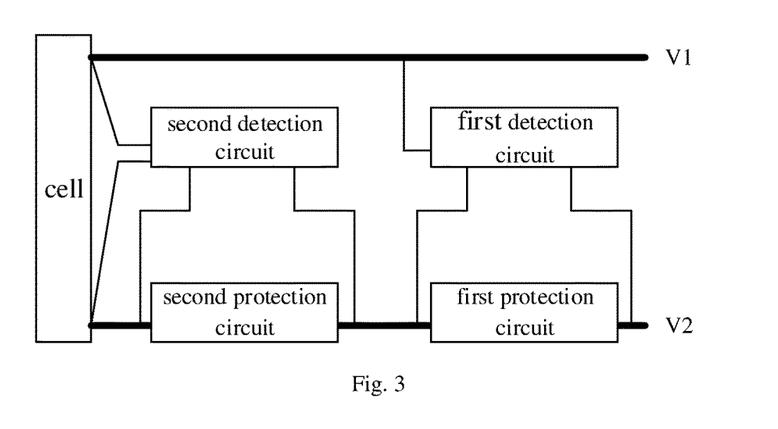
FIG. 3 is a schematic diagram of a battery protection board according to an embodiment of the present disclosure.

FIG. 3 is a schematic diagram of a battery protection board according to an embodiment of the present disclosure. As illustrated in FIG. 3, the first detection circuit is coupled to two detection terminals of the first protection circuit and configured to detect a voltage drop generated by an impedance in the first protection circuit and determine the charging current or the discharging current of the charge and discharge circuit according to the voltage drop detected by the first detection circuit. The second detection circuit is coupled to two detection terminals of the second protection circuit and configured to detect a voltage drop generated by an impedance in the second protection circuit and determine the charging current or the discharging current of the charge and discharge circuit according to the voltage drop detected by the second detection circuit. With this arrangement, the first protection circuit and the second protection circuit are decoupled with each other, so that the circuits may be adjusted according to actual situations without interference with each other.

Figure 4:
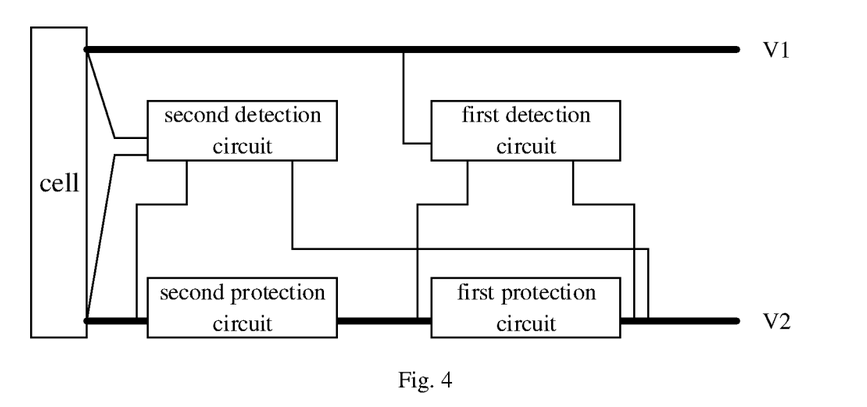
FIG. 4 is a schematic diagram of a battery protection board according to an embodiment of the present disclosure.

FIG. 4 is a schematic diagram of a battery protection board according to an embodiment of the present disclosure. As illustrated in FIG. 4, the first detection circuit is coupled to two detection terminals of the first protection circuit and configured to detect a voltage drop generated by an impedance in the first protection circuit and determine the charging current or the discharging current of the charge and discharge circuit according to the voltage drop detected by the first detection circuit. The second detection circuit is coupled to two detection terminals of the whole protection circuit (i.e. the first protection circuit and the second protection circuit) and configured to detect a voltage drop generated by an impedance in the whole protection circuit and determine the charging current or the discharging current of the charge and discharge circuit according to the voltage drop detected by the second detection circuit. With this arrangement, the connection of the second detection circuit may be more flexible. In addition, with this arrangement, it is only necessary to ensure the sufficient impedance of the first protection circuit for detecting, while the second protection circuit may be provided with the low impedance. In this way, the impedance of the battery protection board may be further reduced, thereby further reducing the quantity of heat generated by the battery protection board.

Figure 5:
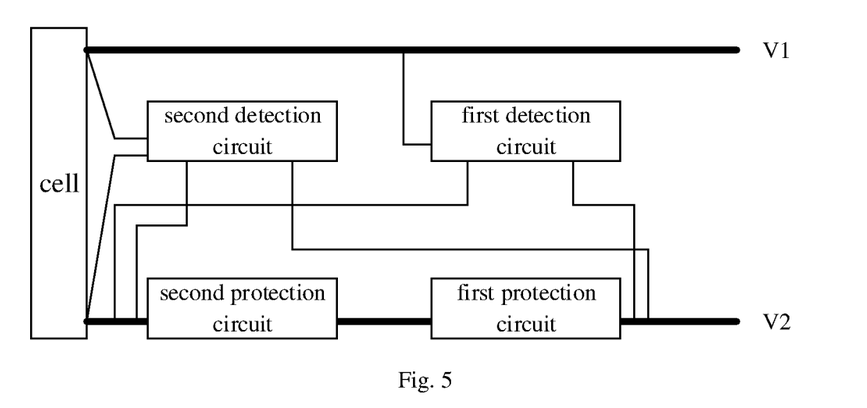
FIG. 5 is a schematic diagram of a battery protection board according to an embodiment of the present disclosure.

FIG. 5 is a schematic diagram of a battery protection board according to an embodiment of the present disclosure. As illustrated in FIG. 5, the first detection circuit is coupled to two detection terminals of the whole protection circuit (i.e. the first protection circuit and the second protection circuit) and configured to detect a voltage drop generated by an impedance in the whole protection circuit and determine the charging current or the discharging current of the charge and discharge circuit according to the voltage drop detected by the first detection circuit. The second detection circuit is coupled to two detection terminals of the whole protection circuit (i.e. the first protection circuit and the second protection circuit) and configured to detect a voltage drop generated by an impedance in the whole protection circuit and determine the charging current or the discharging current of the charge and discharge circuit according to the voltage drop detected by the second detection circuit. With this arrangement, the connection of the first detection circuit and the second detection circuit may be more flexible. In addition, with this arrangement, each of the first protection circuit and the second protection circuit may be provided with the low impedance, as long as a sum of the two impedances is sufficient for detecting the voltage drop. In this way, the impedance of the battery protection board may be further reduced, thereby further reducing the quantity of heat generated by the battery protection board.

Figure 6:
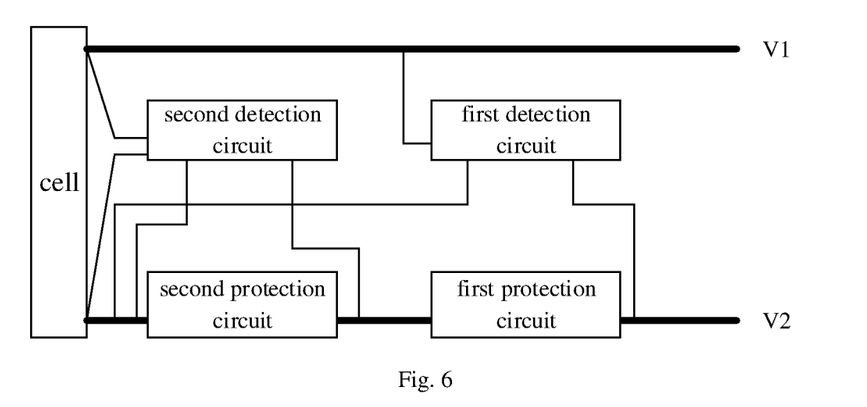
FIG. 6 is a schematic diagram of a battery protection board according to an embodiment of the present disclosure.

FIG. 6 is a schematic diagram of a battery protection board according to an embodiment of the present disclosure. As illustrated in FIG. 6, the first detection circuit is coupled to two detection terminals of the whole protection circuit (i.e. the first protection circuit and the second protection circuit) and configured to detect a voltage drop generated by an impedance in the whole protection circuit and determine the charging current or the discharging current of the charge and discharge circuit according to the voltage drop detected by the first detection circuit. The second detection circuit is coupled to two detection terminals of the second protection circuit and configured to detect a voltage drop generated by an impedance in the second protection circuit and determine the charging current or the discharging current of the charge and discharge circuit according to the voltage drop detected by the second detection circuit. With this arrangement, the connection of the first detection circuit may be more flexible. In addition, with this arrangement, it is only necessary to ensure the sufficient impedance of the second protection circuit for detecting, while the first protection circuit may be provided with the low impedance. In this way, the impedance of the battery protection board may be further reduced, thereby further reducing the quantity of heat generated by the battery protection board.

According to embodiments of the present disclosure, by using the impedance in the protection circuit, instead of adding a special impedance component, it does not only save components and reduces a failure rate of the battery protection board, but also reduces the total impedance of the battery protection board and reduces the quantity of heat generated by the battery protection board.

It is to be understood that, functions of the first detection circuit and the second detection circuit described above may be same or different. The connection between the two detection circuits and the two protection circuits may be flexibly designed to realize different effects.

In addition, in at least one embodiment, an impedance-designed copper wiring on a printed circuit board (PCB) may be implemented in the protection circuit (which may be the first protection circuit, or the second protection circuit, or both). When the impedance of the protection circuit is insufficient, the impedance-designed copper wiring may compensate for the insufficient impedance in the protection circuit.

The impedance in the protection circuit may change with the temperature of the battery protection board. In order to improve a detection accuracy of the detection circuit, a correspondence between the impedance and the temperature in the protection circuit may be stored in advance. In an actual detection, the corresponding impedance may be found according to the temperature of the battery protection board, so as to achieve temperature compensation, thereby ensuring that the detection circuit has higher detection accuracy in an entire operating temperature range.

It is to be understood that, in embodiments of the present disclosure, usage of the charging current or discharging current detected are not particularly limited. In at least one embodiment, the detection circuit may determine whether the charge and discharge process of the battery is abnormal according to the charging current or the discharging current, and control the charge and discharge circuit to turn off via the protection circuit when the charge and discharge process is abnormal. In at least one embodiment, the detection circuit may send the charging current or discharging current detected to a mainboard of the mobile terminal, such that the charging current or the discharging current may be displayed on a display screen of the mobile terminal via the mainboard of the mobile terminal.

In addition to detecting the charging current or discharging current and determining whether the charge and discharge process is abnormal according to the charging current or discharging current, a cell temperature may also be detected, and when the cell temperature is too high, the protection circuit would be controlled to turn off the charge and discharge circuit for protecting the battery. However, in the related art, both the battery protection board and the cell are generally sealed inside the battery, and thus a temperature of the battery protection board, is generally detected and used as the cell temperature.

If a current in a current loop is small, the temperature of the battery protection board is approximately equal to the cell temperature, and thus the temperature of the battery protection board can be regarded as the cell temperature. However, with the popularity of fast charging technologies, the current in the charge and discharge loop becomes higher, and the quantity of heat generated by the battery protection board also becomes higher, such that the temperature of the battery protection board will actually be higher than the cell temperature. In this case, if the temperature of the battery protection board is used as the cell temperature, a larger detection error will occur. In order to reduce the detection error on the cell temperature, in at least one embodiment, the battery protection board further includes a first temperature detection circuit for detecting the cell temperature.

Figure 7:
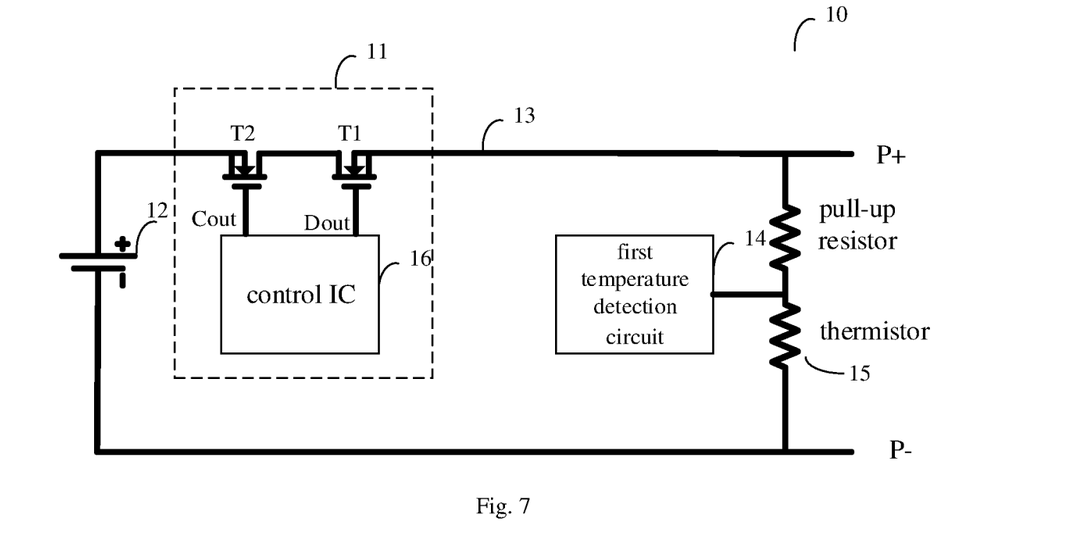
FIG. 7 is a schematic diagram of a battery protection board according to an embodiment of the present disclosure.

FIG. 7 is a schematic diagram of a battery protection board according to an embodiment of the present disclosure. As illustrated in FIG. 7, the battery protection board 10 includes a first protection circuit 11 and a first temperature detection circuit 14.

The first protection circuit 11 is coupled to a charge and discharge circuit 13 of a battery in a mobile terminal. The first protection circuit 11 is configured to control the charge and discharge circuit 13 to turn on or off.

The first temperature detection circuit 14 is coupled to a thermistor 15 on the battery protection board 10 and configured to detect a cell temperature of the mobile terminal via the thermistor 15.

In at least one embodiment, the first protection circuit 11 in FIG. 1 includes a control IC 16 and a pair of back-to-back MOS transistors T1 and T2. The control IC 16 is coupled to the MOS transistor T1 via a terminal Dout and coupled to the MOS transistor T2 via a terminal Cout.

In at least one embodiment, the terminal Cout may be an overcharge control terminal. The MOS transistor T2 is controlled to turn on or off according to a gate voltage of the MOS transistor T2.

In at least one embodiment, the terminal Dout may be an overdischarge, overcurrent, or short-circuit control terminal. The MOS transistor T1 is controlled to turn on or off according to a gate voltage of the MOS transistor T1.

In at least one embodiment, P+ represents a positive electrode of the battery protection board 10, and P− represents a negative electrode of the battery protection board 10. Or, P+ represents a positive electrode of a cell 12 coupled to the battery protection board 10, and P− represents a negative electrode of the cell 12 coupled to the battery protection board 10.

Figure 8:
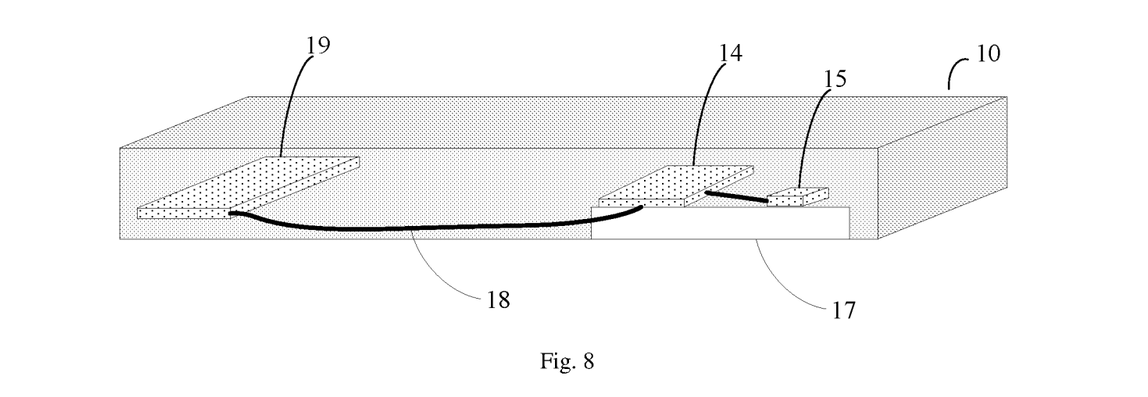
FIG. 8 is a schematic diagram illustrating a battery protection board according to an embodiment of the present disclosure.

In the related art, a ground layer is formed below the first temperature detection circuit 14, resulting in that the heat generated by other circuits of the battery protection board 10 is conducted to the thermistor 15 via the ground layer. In order to avoid this phenomenon, as illustrated in FIG. 8, in embodiments of the present disclosure, the ground layer is not formed in an area below the thermistor 15, and this area below the thermistor 15 is hollowed to form a hollow area 17. A negative electrode of the first temperature detection circuit 14 is directly coupled to a main ground 19 of the battery protection board 10 via a ground wire 18. In this way, the first temperature detection circuit 14 is isolated from other heating sources of the battery protection board 10, and the influence of the temperature of the battery protection board 10 on the thermistor 15 is reduced, thereby making the temperature detected by the first temperature detection circuit 14 closer to the cell temperature.

It is to be understood that, the main ground 19 may be located in a main ground layer of the battery protection board 10. Specific position of the main ground layer in the battery protection board 10 is not limited in this embodiment of the present disclosure, for example, the main ground layer may be located between two board layers of the battery protection board 10.

In addition, the first temperature detection circuit 14 may be located around an edge of the battery protection board 10, so as to ensure that the first temperature detection circuit 14 is not at a center of the heat sources of the battery protection board 10, thereby further improving the detection accuracy of the cell temperature. Accordingly, the thermistor 15 may be located around the edge of the battery protection board 10.

In at least one embodiment, as illustrated in FIG. 7, one terminal of the thermistor 15 may be coupled to the positive electrode P+ of the battery protection board 10 via a pull-up resistor.

In at least one embodiment, the thermistor 15 may be a NFC resistor.

Figure 9:
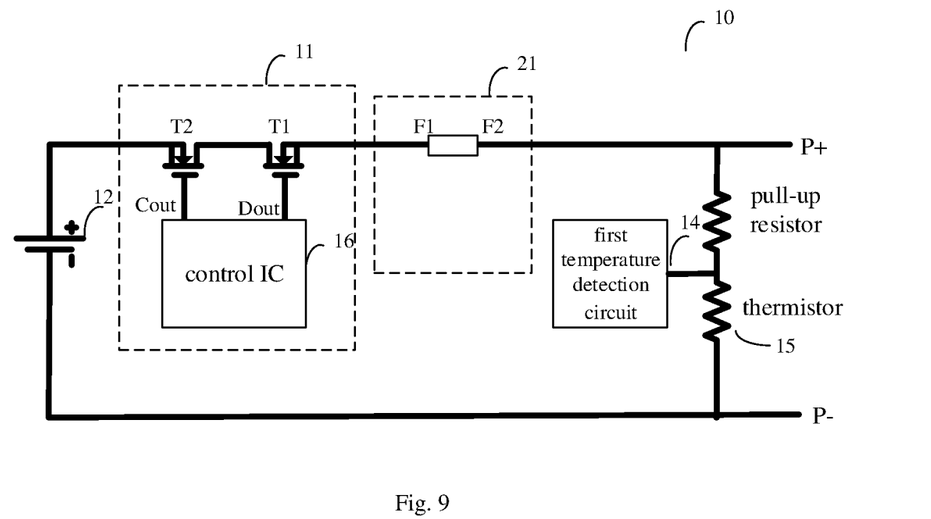
FIG. 9 is a schematic diagram of a battery protection board according to an embodiment of the present disclosure.

In order to further improve the protection performance of the battery protection board 10, in at least one embodiment, as illustrated in FIG. 9, the battery protection board 10 may further include a second protection circuit 21. The second protection circuit 21 may provide protection for the charge and discharge process of the battery in the case that the first protection circuit 11 is disabled.

In at least one embodiment, the second protection circuit 21 may provide overvoltage or overcurrent protection for the charge and discharge process of the battery via a fuse. As illustrated in FIG. 9, the second protection circuit 21 may include a first fuse pin F1 and a second fuse pin F2. When the overvoltage or overcurrent occurs in the charge and discharge circuit 13, the fuse between the first fuse pin F1 and the second fuse pin F2 in the second protection circuit 21 is blown.

An electric quantity of the battery may also be detected, such that the charging mode of the battery may be switched according to the electric quantity of the battery.

In at least one embodiment, the battery protection board further includes a battery voltmeter. The battery voltmeter is coupled to a current sensing component in the battery protection board. During the charge and discharge process of the battery, the battery voltmeter detects a second voltage drop of the current sensing component and determines an electric quantity of the battery according to the second voltage drop.

Figure 10:
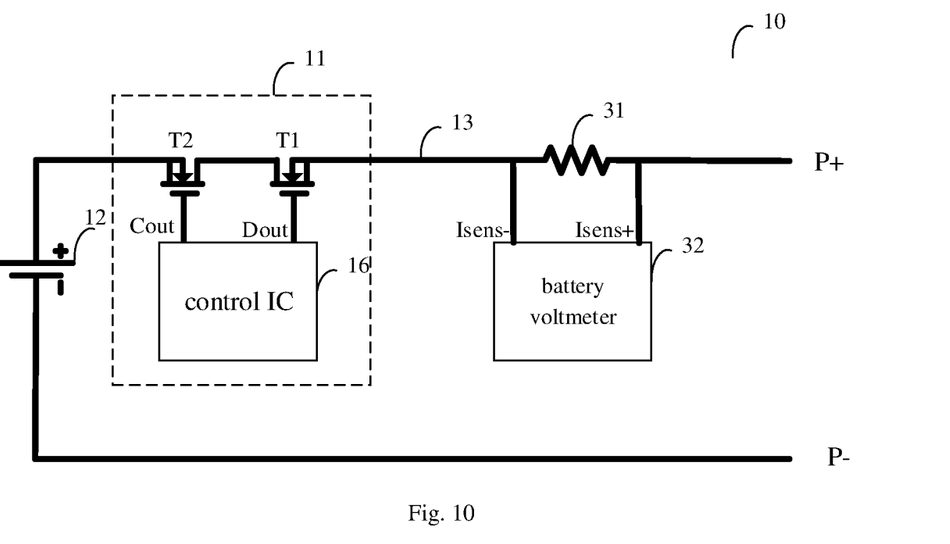
FIG. 10 is a schematic diagram of a battery protection board according to an embodiment of the present disclosure.

FIG. 10 is a schematic diagram of a battery protection board according to an embodiment of the present disclosure.

As illustrated in FIG. 10, the battery protection board 10 includes a first protection circuit 11, a current sensing resistor 31 and a battery voltmeter 32.

The first protection circuit 11 is coupled to a charge and discharge circuit 13 of a battery in a mobile terminal. The first protection circuit 11 is configured to control the charge and discharge circuit 13 to turn on or off.

The current sensing resistor 31 is coupled to the charge and discharge circuit 13 in series.

The battery voltmeter 32 is coupled to two terminals of the current sensing resistor 31. The battery voltmeter 32 is configured to detect a second voltage drop generated by an impedance of the current sensing resistor 31 and determine an electric quantity of the battery according to the second voltage drop during the charge and discharge process of the battery.

With respect to the first protection circuit 11, reference may be made to the embodiments described above, which may not be elaborated here.

Since the size of the mobile terminal is getting smaller and smaller, requirements on the integration level of the circuit thereof are getting higher and higher. The battery protection board in an embodiment of the present disclosure not only incorporates any combination of the protection circuit, the detection circuit and the first temperature detection circuit, but also incorporates the battery voltmeter. Therefore, the battery protection board in the present disclosure has a higher integration level, and is suitable to be applied in the mobile terminal for protecting the battery of the mobile terminal.

In order to further reduce the size of the mobile terminal, in at least one embodiment, the current sensing resistor 31 may be removed, and the battery voltmeter 32 may be coupled to two terminals of one or more MOS transistors in the protection circuit. That is, a resistor $R_{ds}$ of the MOS transistors may be used to replace the current sensing resistor 31 and achieve the current detection function, which may further reduce the number of elements in the battery protection board 10. However, in this case, there is a higher requirement on the reliability of the MOS transistor(s) in the protection circuit 11.

Figure 11:
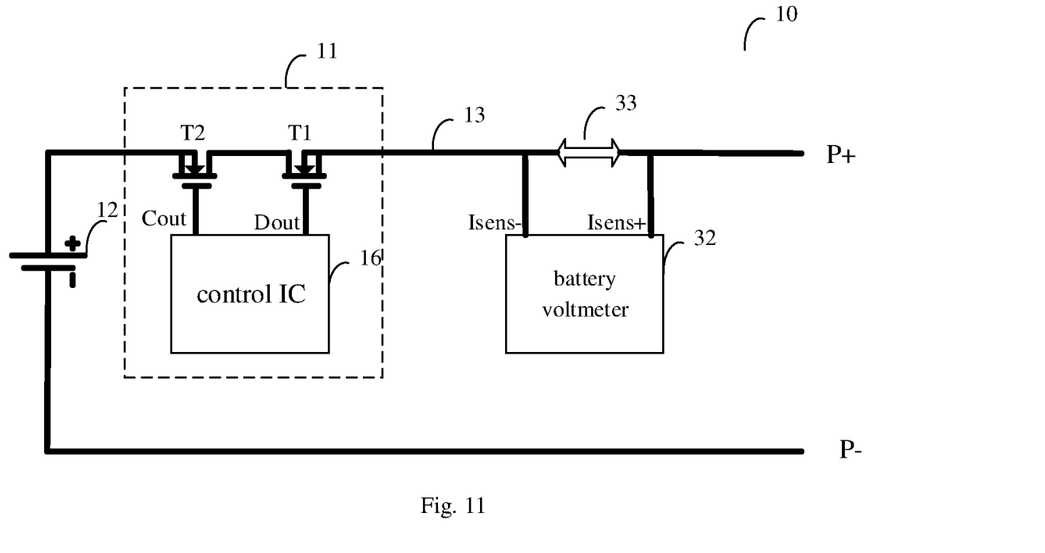
FIG. 11 is a schematic diagram of a battery protection board according to an embodiment of the present disclosure.

In at least one embodiment, as illustrated in FIG. 11, the battery voltmeter 32 may be coupled to a wire 33 (the wire 33 may be a length of wiring in the battery protection board 10, which may be an impedance-designed copper wiring) in the battery protection board 10. That is, the resistor of the wire 33 in the battery protection board 10 is used to replace the current sensing resistor 31 in FIG. 10. This not only can reduce the number of elements in the battery protection board, thereby saving the area and cost of the battery protection board, but also can reduce the failure rate of the battery protection board.

In the related art, the battery protection board is usually sealed together with the cell in the battery. Since a volume of the battery is limited, an area and a thickness of the battery protection board will be relatively small, such that the battery protection board has a relatively high impedance, resulting in poor heat dissipation in the battery protection board.

The solution in FIG. 11 may improve the integration of the battery protection board 10, but since the area of the battery protection board is limited, the quantity of heat generated by the wire 33 may be relatively large during the current detection process, resulting in a higher temperature rise in the battery protection board. Typically, the impedance of the wire (such as copper wire) is positively correlated to temperature. That is, the greater the temperature is, the greater the impedance of the wire is. If the battery voltmeter 32 detects the current in the charge and discharge circuit by regarding that the current sensing resistor (in FIG. 11, the current sensing resistor is the wire) has a fixed impedance, then the higher the temperature rise of the battery protection board is, the more inaccurate the detection result of the battery voltmeter 32 is.

Figure 12:
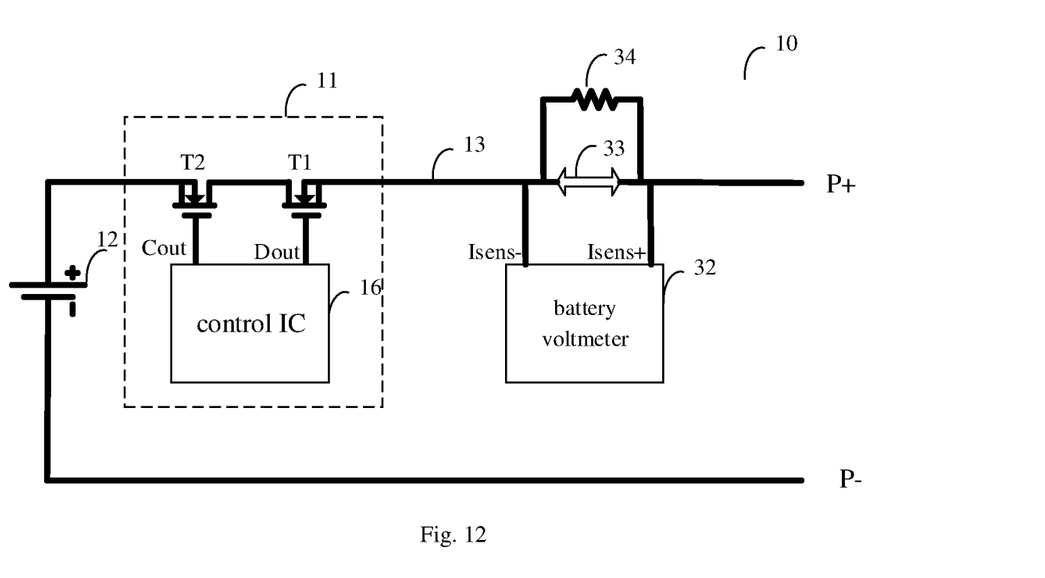
FIG. 12 is a schematic diagram of a battery protection board according to an embodiment of the present disclosure.

In order to improve the accuracy of the calculation result of the battery voltmeter, an embodiment illustrated in FIG. 12 may be provided. As illustrated in FIG. 12, a NTC resistor 34 is coupled to the wire 33 in parallel. The resistance of the NTC resistor 34 decreases as the temperature increases. By selecting a suitable NTC resistor and coupling the suitable NTC resistor to the wire 33 in parallel, an influence of the temperature on the impedance of the wire may be counteracted to some extent, thereby making the detection result of the battery voltmeter 32 more accurate.

It is to be understood that, other embodiments of the present disclosure may also select other temperature compensation electronic component and/or circuit (such as a NTC electronic component), as long as the temperature compensation electronic component and/or circuit (such as the NTC electronic component) can counteract/compensate the influence of the temperature change on the impedance of the wire or the impedance change, thereby ensuring the accuracy of the detection result of the battery voltmeter.

Figure 13:
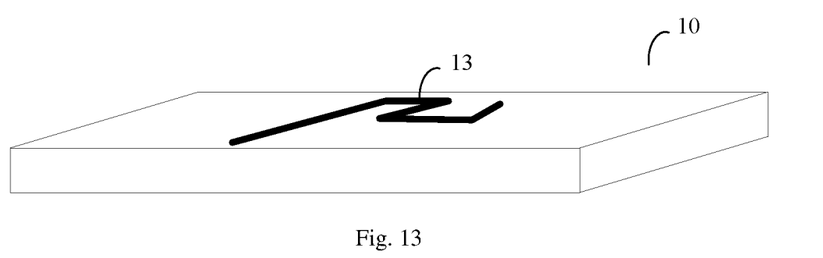
FIG. 13 is a schematic diagram of a battery protection board according to an embodiment of the present disclosure.

In order to reduce the impedance of the battery protection board in the limited space, in at least one embodiment, at least part of a wiring of the main path of the battery protection board 10 (including the charge and discharge circuit 13) is configured on a surface layer of the battery protection board 10 and is exposed by windowing. As illustrated in FIG. 13, the wiring of the charge and discharge circuit 13 is located on the upper surface of the battery protection board 10, and windowing refers to that the surface of the wiring of the charge and discharge circuit 13 is not coated with insulating material such as green oil, such that the charge and discharge circuit 13 can perform heat exchange with outside environment better, thus dissipating heat quickly.

Figure 14:
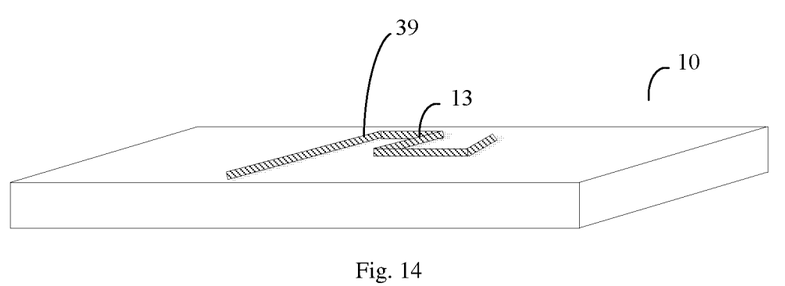
FIG. 14 is a schematic diagram of a battery protection board according to an embodiment of the present disclosure.

Further, in some embodiments, as illustrated in FIG. 14, a conductive sheet 39 may be provided on the surface layer of the battery protection board 10. The conductive sheet 39 is electrically coupled to the wiring of the charge and discharge circuit, such that the thickness of the wiring is increased. In at least one embodiment, the conductive sheet 39 may extend toward outside of the battery protection board 10 in a direction perpendicular to the battery protection board 10 (or the surface layer of the battery protection board 10).

In detail, the conductive sheet 39 may be customized to have a shape same with (or similar to) the shape of the wiring of the main path on the surface of the battery protection board. For example, the shape of the conductive sheet 39 may be same with the shape of the wiring of the charge and discharge circuit. The conductive sheet 39 may be attached to the wiring area with copper exposed, such that the thickness of the wiring is increased without increasing the thickness of the battery protection board 10, thus reducing the impedance of the battery protection board 10, and further reducing the temperature rise of the battery protection board 10.

It is to be understood that, the shape of the conductive sheet 39 is not limited to a plane shape. For example, the conductive sheet 39 may have a spatial structure with pins. With the pins passing through vias on the battery protection board 10, the conductive sheet 39 is welded on the battery protection board 10.

Further, in at least one embodiment, the battery voltmeter 32 may be integrated together with the first protection circuit 11, such that the number of elements in the battery protection circuit 10 is further reduced, and the wiring in the battery protection circuit 10 is more smooth.

Figure 15:
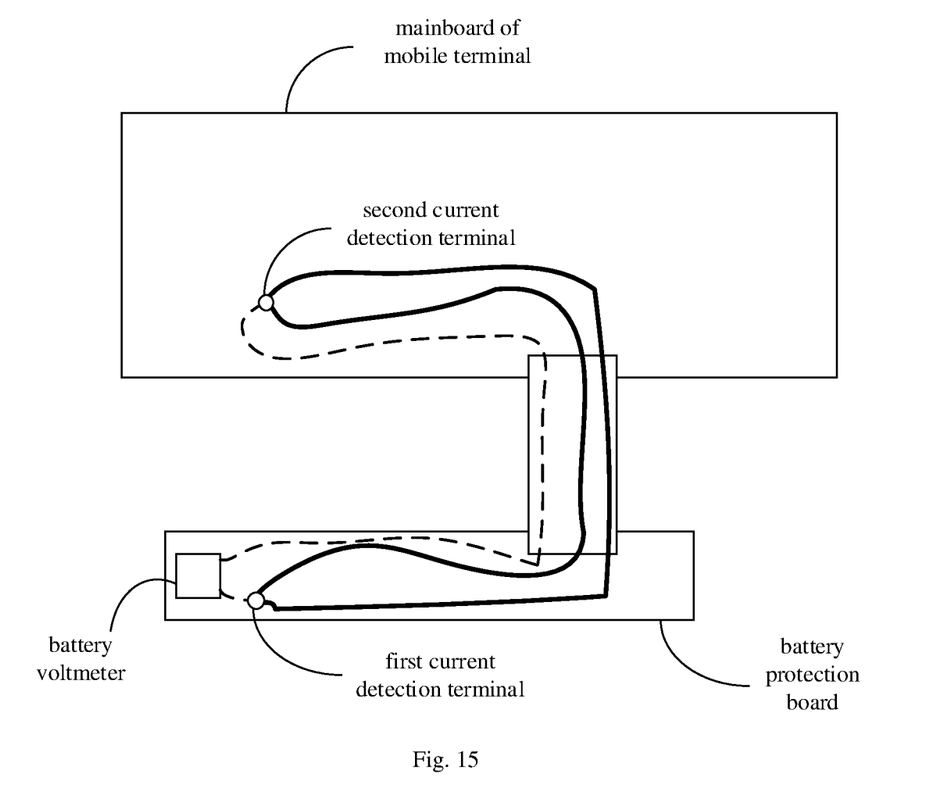
FIG. 15 is a schematic diagram illustrating a connection of a battery voltmeter according to an embodiment of the present disclosure.

In order to increase an area of the wire 33 for dissipating the generated heat quickly, as illustrated in FIG. 15, a current detection terminal of the battery voltmeter 32 is coupled to the current loop of the battery protection board 10, and the current detection terminal of the battery voltmeter 32 is coupled to a current loop of a mainboard of the mobile terminal via a connector between the battery protection board and the mainboard. It should be noted that the dotted line in FIG. 15 illustrates the current detection lines of the battery voltmeter 32. This can ensure that the area of this wire 33 is large enough, and the heat can be dissipated timely, thereby reducing the heat of the battery protection board.

The impedance of the wire 33 can be obtained by calculation or simulation. After the impedance of this wire is obtained, the battery protection board and the mainboard may be coupled together. An external power supply is used for providing a constant current for the current loop, such that the impedance of this wire is corrected, thereby ensuring the detection accuracy of the battery voltmeter 32.

The impedance of the wire 33 in the battery protection board 10 may change as the temperature of the battery or the battery protection board 10 changes. In the case of using the wire 33 to replace the current sensing resistor 31, in at least one embodiment, a second temperature detection circuit may be added to the battery protection board, in order to measure the current flowing through the wire 33 more accurately.

Figure 16:
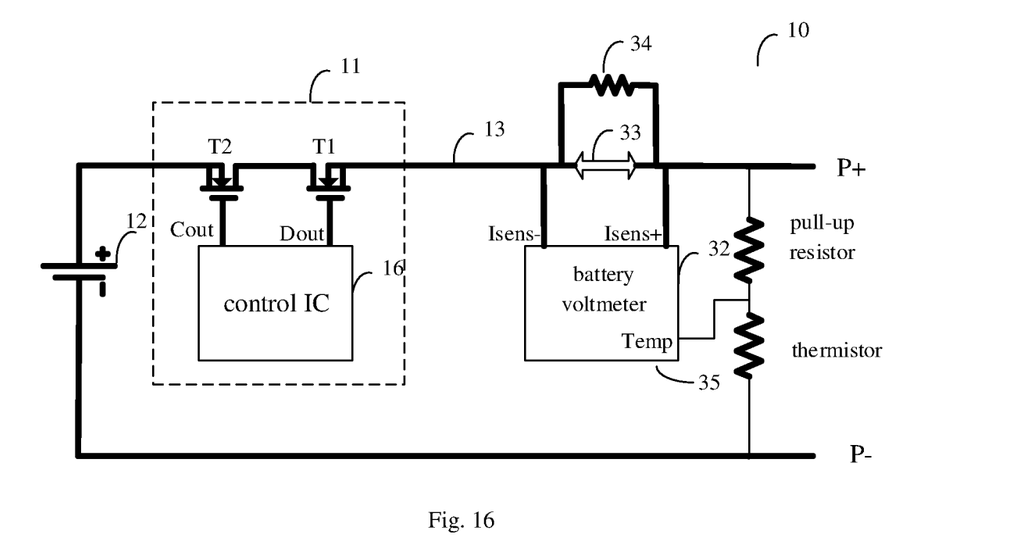
FIG. 16 is a schematic diagram of a battery protection board according to an embodiment of the present disclosure.

FIG. 16 is a schematic diagram of a battery protection board according to an embodiment of the present disclosure. As illustrated in FIG. 16, the second temperature detection circuit 35 is integrated in the battery voltmeter 32. In another embodiment, the second temperature detection circuit 35 and the battery voltmeter 32 may be provided separately.

The second temperature detection circuit 35 is configured to detect a temperature of the battery or the battery protection board 10. The battery voltmeter 32 may be coupled to the second temperature detection circuit 35. The battery voltmeter 32 may be configured to: determine an impedance of the wire 33 at a current temperature according to the temperature detected by the second temperature detection circuit 35 and a correspondence between the impedance of the wire 33 and the temperature (the correspondence may be pre-stored in a memory of the battery protection board 10); determine a current flowing through the wire 33 according to the impedance of the wire 33 at the current temperature and the voltage drop generated by the impedance of the wire 33 at the current temperature; and determine the electric quantity of the battery according to the current flowing through the wire 33.

In at least one embodiment, the second temperature detection circuit 35 may detect the temperature via a thermistor. In some embodiments, the thermistor may be a NTC resistor, or a PTC (positive temperature coefficient) resistor. In at least one embodiment, one terminal of the thermistor is coupled to the positive electrode P+ of the battery protection board 10 via a pull-up resistor.

Figure 17:
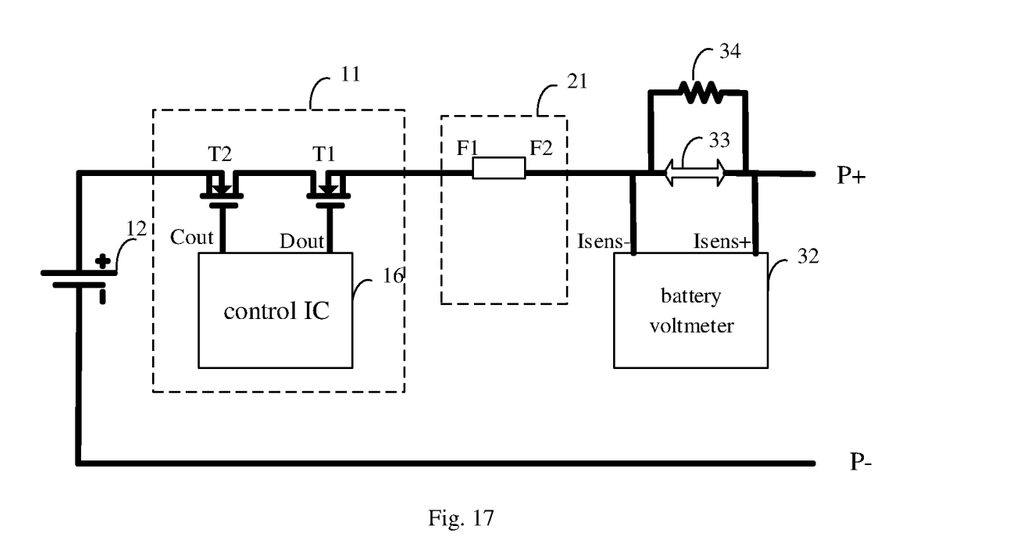
FIG. 17 is a schematic diagram of a battery protection board according to an embodiment of the present disclosure.

In at least one embodiment, as illustrated in FIG. 17, the battery protection board 10 may further include a second protection circuit 21. With respect to the second protection circuit 21, reference may be made to the above embodiments, which is not elaborated here.

In order to reduce the temperature of the battery protection board, a heat dissipation plate may be provided in the battery protection board to conduct the heat generated by the wire to other low temperature areas of the battery protection board.

Figure 18:
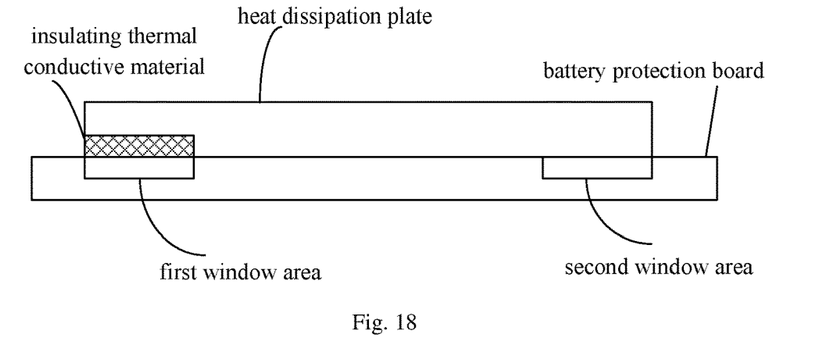
FIG. 18 is a schematic diagram of a battery protection board according to an embodiment of the present disclosure.

FIG. 18 is a schematic diagram of a battery protection board according to an embodiment of the present disclosure. As illustrated in FIG. 18, the wire 33 is located in a first window area of the battery protection board. A first terminal of the heat dissipation plate is coupled to the first window area via an insulating thermal conductive material. A second terminal of the heat dissipation plate is coupled to a second window area of the battery protection board 10. During the working process of the battery protection board, the quantity of heat generated by the second window area is lower than the quantity of heat generated by the first window area. That is, the second window area is a low temperature area. The heat dissipation plate is configured to conduct heat of the first window area to the second window area.

In at least one embodiment, the heat dissipation plate may be located in the second window area.

In at least one embodiment, the heat dissipation plate is made of copper, i.e. the heat dissipation plate may be a copper plate. It is to be understood that the specific shape of the heat dissipation plate is not limited in embodiments of the present disclosure. The shape of the heat dissipation plate may be adjusted according to a shape of peripheral components of the battery protection board.

In at least one embodiment, the insulating thermal conductive material is insulating thermal conductive silica gel.

Embodiments of the present disclosure also provide a battery and a mobile terminal.

Figure 19:
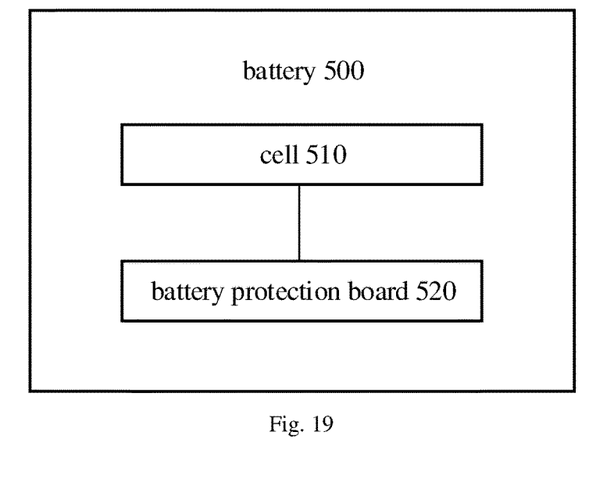
FIG. 19 is a block diagram illustrating a battery according to an embodiment of the present disclosure.

FIG. 19 is a block diagram illustrating a battery according to an embodiment of the present disclosure. As illustrated in FIG. 19, the battery 500 includes a charge and discharge circuit (not illustrated), a cell 510 and a battery protection board 520. The cell 510 is coupled to the charge and discharge circuit. The battery protection board 520 is coupled to the cell 510.

It should be understood that the battery protection board 520 in FIG. 17 may be the battery protection board 10 described above, which will not be elaborated here for clarity.

Figure 20:
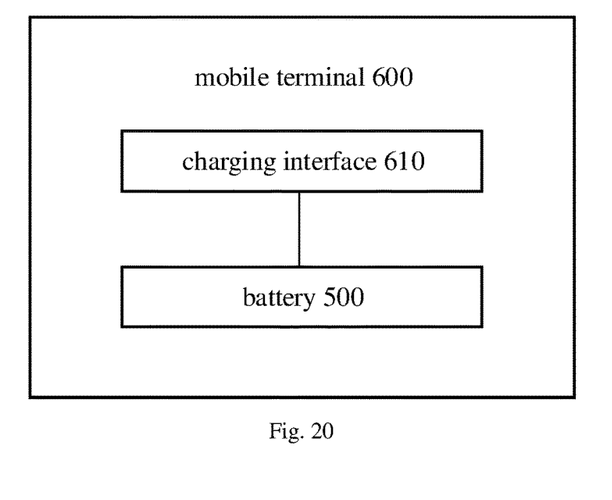
FIG. 20 is a block diagram illustrating a mobile terminal according to an embodiment of the present disclosure.

FIG. 20 is a block diagram illustrating a mobile terminal according to an embodiment of the present disclosure. As illustrated in FIG. 20, the mobile terminal 600 includes a charging interface 610 and the battery 500. The battery 500 is coupled to the charging interface 610.

In at least one embodiment, the mobile terminal 600 is configured to support a first charging mode and a second charging mode. A charging speed of the second charging mode is greater than a charging speed of the first charging mode.

In at least one embodiment, a charging current of the second charging mode is greater than a charging current of the first charging mode.

In at least one embodiment, a charging voltage of the second charging mode is greater than a charging voltage of the first charging mode.

In at least one embodiment, the mobile terminal 600 is configured to perform a bidirectional communication with an adapter via the charging interface 610, under the second charging mode.

The first charging mode is a normal charging mode and the second charging mode is a fast charging mode. Under the normal charging mode, the adapter outputs a relatively small current (typically less than 2.5 A) or charges the battery in the mobile terminal with a relatively small power (typically less than 15 W). While, under the fast charge mode, the adapter outputs a relatively large current (typically greater than 2.5 A, such as 4.5 A, 5 A or higher) or charges the battery in the mobile terminal with a relatively large power (typically greater than or equal to 15 W), compared to the normal charging mode. In the normal charging mode, it may take several hours to fully fill a larger capacity battery (such as a battery with 3000 mAh), while in the fast charging mode, the period of time may be significantly shortened when the larger capacity battery is fully filled, and the charging is faster.

The communication process between the mobile terminal and the adapter may not be specifically defined here. For example, the communication between the mobile terminal and the adapter may refer to a handshake process between the mobile terminal and the adapter. That is, the mobile terminal and the adapter may determine the charging mode, the charging voltage, the charging current and other parameters by the handshake.

Those skilled in the art should appreciate that units and algorithm steps in each example described in connection with the embodiments disclosed herein can be implemented in electronic hardware, or a combination with computer software and electronic hardware. Whether these functions are implemented in hardware or software depends on the specific application and design constraints of the technical solution. The skilled in the art may use different methods to implement the described functions for each particular application, but such implementations should not be considered beyond the scope of the present disclosure.

It should be apparent to those skilled in the art that the specific processes of the systems, apparatuses and units described above may be referred to the corresponding processes in the foregoing embodiments of the methods and will not be described here for the convenience and simplicity of description.

In several embodiments provided in the present disclosure, it should be understood that the disclosed systems, apparatuses, and methods may be implemented in other ways. For example, the embodiments of the apparatuses described above are merely illustrative, for example, the division of units is a logical function division only, and there may be another division in actually implementing, for example, multiple units or components may be combined or may be integrated into another system, or some features may be ignored or not executed. In other respects, the shown or discussed coupling or direct coupling or communication connection between each other may be via interfaces, and the indirect coupling or communication connection between apparatuses or units, which may be electrical, mechanical, or otherwise.

The units described as the separation components may or may not be physically separate, and the components shown as units may or may not be physical units, i.e., may be located in one place or may be distributed over a plurality of network elements. The part or all of the units may be selected according to the actual needs to achieve objectives of embodiments of the present disclosure.

In addition, each function unit in the various embodiments of the present disclosure may be integrated in a processing unit, or each function unit may be separate physical existence, or two or more units may be integrated in a unit.

The functions can be stored in a computer-readable storage medium if they are implemented in the form of software functional units and sold or used as standalone products.

Based on this understanding, the technical solution of the present disclosure contributing to the related art either essentially or in part or a part of the technical solution may be embodied in the form of a software product stored in a storage medium, including several instructions used to enable computer devices (which may be personal computers, servers, or network devices, etc.) to perform all or part of the steps described in the various embodiments of the present disclosure. The aforementioned storage medium includes a variety of media such as a U disk, a mobile hard disk, a read-only memory (ROM for short), a random access memory (RAM for short), a magnetic disk, or an optical disk.

As described above, only the specific embodiments of the present disclosure, the scope of the present disclosure is not limited thereto, and those skilled in the art will be able to easily think of variations or substitutions within the technical scope of the present disclosure, which should be covered within the scope of the present disclosure. Accordingly, the scope of protection of the present disclosure should be based on the scope of protection of the claims.

What is claimed is:

1. A battery protection board, comprising:
    a protection circuit coupled in series between a positive electrode of a battery and a positive electrode of the battery protection board, a negative electrode of the battery being coupled to a negative electrode of the battery protection board, a charge and discharge circuit being configured to provide output ends as the positive electrode of the battery protection board and the negative electrode of the battery protection board to charge the battery;
    a detection circuit configured to detect a first voltage drop generated by an impedance of the at least part of the protection circuit and determine a charging current or a discharging current of the charge and discharge circuit according to the first voltage drop and the impedance of the at least part of the protection circuit during a charge and discharge process of the battery;
    a battery voltmeter, coupled to a current sensing component in the battery protection board, and configured to detect a second voltage drop of the current sensing component and determine an electric quantity of the battery according to the second voltage drop during the charge and discharge process of the battery, wherein the current sensing component comprises a length of wire in the charge and discharge circuit,
    wherein the protection circuit comprises a first protection circuit and at least one second protection circuit, the detection circuit comprises a first detection circuit and at least one second detection circuit,
    the first protection circuit is configured to control the charge and discharge circuit to turn off based on a detection result of the first detection circuit,
    the second protection circuit is configured to control the charge and discharge circuit to turn off based on a detection result of a corresponding second detection circuit, when the first protection circuit fails.

2. The battery protection board according to claim 1, wherein the detection circuit is further configured to determine whether the charge and discharge process of the battery is abnormal according to the charging current or the discharging current, and the protection circuit is configured to control the charge and discharge circuit to turn off when the charge and discharge process is abnormal.

3. The battery protection board according to claim 1, wherein the detection circuit is further configured to detect a temperature of the battery protection board and to determine the impedance of the at least part of the protection circuit according to the temperature of the battery protection board and a pre-stored correspondence between the impedance and the temperature.

4. The battery protection board according to claim 1, wherein the first detection circuit is further configured to detect a battery voltage of the mobile terminal; and the second detection circuit is further configured to detect a cell voltage of the mobile terminal.

5. The battery protection board according to claim 1, wherein the protection circuit comprises the first protection circuit and one second protection circuit, the detection circuit comprises the first detection circuit and one second detection circuit,
    the first protection circuit is coupled to the second protection circuit in series, at least part of the first protection circuit has a first detection terminal and a second detection terminal, at least part of the second protection circuit has a third detection terminal and a fourth detection terminal, the second detection terminal is adjacent to the third detection terminal, wherein
    a first terminal of the first detection circuit is coupled to the first detection terminal, a second terminal of the first detection circuit is coupled to the second detection terminal, a first terminal of the second detection circuit is coupled to the third detection terminal, and a second terminal of the second detection circuit is coupled to the fourth detection terminal, or
    a first terminal of the first detection circuit is coupled to the first detection terminal, a second terminal of the first detection circuit is coupled to the second detection terminal, a first terminal of the second detection circuit is coupled to the first detecting terminal, and a second terminal of the second detection circuit is coupled to the fourth detection terminal, or
    a first terminal of the first detection circuit is coupled to the first detection terminal, a second terminal of the first detection circuit is coupled to the fourth detection terminal, a first terminal of the second detection circuit is coupled to the third detection terminal, and a second terminal of the second detection circuit is coupled to the fourth detection terminal, or
    a first terminal of the first detection circuit is coupled to the first detection terminal, a second terminal of the first detection circuit is coupled to the fourth detection terminal, a first terminal of the second detection circuit is coupled to the first detecting terminal, and a second terminal of the second detection circuit is coupled to the fourth detection terminal.

6. The battery protection board according to claim 1, wherein the at least part of the protection circuit comprises an impedance-designed copper wiring.

7. The battery protection board according to claim 1, further comprising:
    a first temperature detection circuit, coupled to a thermistor on the battery protection board and configured to detect a cell temperature of the mobile terminal via the thermistor, wherein an area below the thermistor is hollow, and a ground wire of the first temperature detection circuit is directly coupled to a main ground wire of the battery protection board.

8. The battery protection board according to claim 7, wherein the thermistor is configured around an edge of the battery protection board, and the thermistor comprises a negative temperature coefficient resistor.

9. The battery protection board according to claim 1, the length of wire is coupled to an electronic temperature compensation component in parallel for compensating an influence of temperature change on an impedance of the length of wire; or the battery protection board further comprises a heat dissipation plate, the length of wire is located in a first window area of the battery protection board, a first terminal of the heat dissipation plate is coupled to the first window area via an insulating thermal conductive material, a second terminal of the heat dissipation plate is coupled to a second window area of the battery protection board, and the heat dissipation plate is configured to conduct heat of the first window area to the second window area, or the length of wire has a first position and a second position of the charge and discharge circuit, the first position is located in the battery protection board, and the second position is located in a mainboard of the mobile terminal.

10. The battery protection board according to claim 9, wherein the electronic temperature compensation component comprises a negative temperature coefficient resistor and the length of wire comprises an impedance-designed wiring in the battery protection board.

11. The battery protection board according to claim 9, wherein the heat dissipation plate is located in the second window area.

12. The battery protection board according to claim 9, wherein the battery voltmeter is coupled to the second position via a connector between the battery protection board and the mainboard.

13. The battery protection board according to claim 1, further comprising:

a second temperature detection circuit configured to detect a temperature of the battery protection board; wherein the battery voltmeter is coupled to the second temperature detection circuit and configured to determine an impedance of the current sensing component at a current temperature according to the temperature detected by the second temperature detection circuit and a correspondence between the impedance of the current sensing component and the temperature, to determine a current flowing through the current sensing component according to the impedance of the current sensing component at the current temperature and the second voltage drop, and to determine the electric quantity of the battery according to the current flowing through the current sensing component.

14. The battery protection board according to claim 13, wherein the second temperature detection circuit is integrated in the battery voltmeter, and/or the protection circuit is integrated with the battery voltmeter.

15. The battery protection board according to claim 1, wherein at least part of a wiring of the charge and discharge circuit is configured on a surface layer of the battery protection board and is exposed by windowing.

16. The battery protection board according to claim 15, wherein a conductive sheet is provided on the surface layer of the battery protection board, and the conductive sheet is electrically coupled to the wiring of the charge and discharge circuit, and the conductive sheet extends toward outside of the battery protection board in a direction perpendicular to the surface layer of the battery protection board, and a shape of the conductive sheet is same with a shape of the wiring of the charge and discharge circuit.

17. The battery protection board according to claim 1, wherein the protection circuit comprises two field-effect transistors provided back-to-back; or the protection circuit comprises:
a field-effect transistor, located in the charge and discharge circuit; and
a controller, coupled to the field-effect transistor and configured to control the charge and discharge circuit to turn on or off via the field-effect transistor.

18. The battery protection board according to claim 1, wherein the second protection circuit is configured to be coupled to the charge and discharge circuit and the second protection circuit comprises a fuse.

19. A battery, comprising:
a charge and discharge circuit;
a cell coupled to the charge and discharge circuit; and
a battery protection board coupled to the cell, wherein the battery protection board comprises:
a protection circuit, coupled in series between a positive electrode of a cell and a positive electrode of the battery protection board, a negative electrode of the cell being coupled to a negative electrode of the battery protection board, the charge and discharge circuit being configured to provide output ends as the positive electrode of the battery protection board and the negative electrode of the battery protection board to charge the cell;
a detection circuit, coupled to at least part of the protection circuit and configured to detect a first voltage drop generated by an impedance of the at least part of the protection circuit and determine a charging current or a discharging current of the charge and discharge circuit according to the first voltage drop and the impedance of the at least part of the protection circuit during a charge and discharge process of the battery;
a battery voltmeter, coupled to a current sensing component in the battery protection board, and configured to detect a second voltage drop of the current sensing component and determine an electric quantity of the battery according to the second voltage drop during the charge and discharge process of the battery, wherein the current sensing component comprises a length of wire in the charge and discharge circuit,
wherein the protection circuit comprises a first protection circuit and at least one second protection circuit, the detection circuit comprises a first detection circuit and at least one second detection circuit,
the first protection circuit is configured to control the charge and discharge circuit to turn off based on a detection result of the first detection circuit,
the second protection circuit is configured to control the charge and discharge circuit to turn off based on a detection result of a corresponding second detection circuit, when the first protection circuit fails.

* * * * *